US010810705B2

(12) United States Patent
Guo et al.

(10) Patent No.: US 10,810,705 B2
(45) Date of Patent: Oct. 20, 2020

(54) VIDEO DEHAZING DEVICE AND METHOD

(71) Applicant: NATIONAL CHIAO TUNG UNIVERSITY, Hsinchu (TW)

(72) Inventors: Jiun-In Guo, Hsinchu (TW); Cheng-Yen Lin, New Taipei (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 292 days.

(21) Appl. No.: 16/004,451

(22) Filed: Jun. 11, 2018

(65) Prior Publication Data

US 2019/0287219 A1 Sep. 19, 2019

(30) Foreign Application Priority Data

Mar. 15, 2018 (TW) .............................. 107108903 A

(51) Int. Cl.
*G06T 5/00* (2006.01)
*G06T 7/70* (2017.01)
(Continued)

(52) U.S. Cl.
CPC ................ *G06T 5/002* (2013.01); *G06T 7/70* (2017.01); *H04N 5/2351* (2013.01);
(Continued)

(58) Field of Classification Search
CPC . G06T 5/002; G06T 7/70; G06T 2207/20216; G06T 2207/20182;
(Continued)

(56) References Cited

U.S. PATENT DOCUMENTS 8,774,555 B2 * 7/2014 Xianghui .................. G06T 5/00
382/274
9,197,789 B2 * 11/2015 Mukhopadhyay ... H04N 1/6027
(Continued)

FOREIGN PATENT DOCUMENTS

CN 104794697 A 7/2015
TW I501194 B 9/2015
(Continued)

OTHER PUBLICATIONS

Mao Xiangyu et al, "Single image dehazing algorithm based on sky segmentation", Journal of Computer Applications, Oct. 10, 2017.
(Continued)

*Primary Examiner* — Xuemei G Chen
(74) *Attorney, Agent, or Firm* — CKC & Partners Co., LLC

(57) ABSTRACT

A video dehazing method includes: capturing a hazy image including multiple inputted pixels by an image capture module, calculating an atmospheric light value according to the inputted pixels by an atmospheric light estimation unit, determining a sky image area according to the inputted pixels via the intermediate calculation results of a guided filter by a sky detection unit; calculating a dark channel image according to the inputted pixels based on dark channel prior (DCP) by a dark channel prior unit; calculating a fine transmission image according to the inputted pixels, the atmospheric light value, the sky image area and the dark channel image via a guided filter by a transmission estimation unit, generating a dehazing image according to the inputted pixels, the atmospheric light value and the fine transmission image by an image dehazing unit, and outputting the dehazing image by a video outputting module.

18 Claims, 7 Drawing Sheets

(51) Int. Cl.
*H04N 5/243* (2006.01)
*H04N 5/235* (2006.01)

(52) U.S. Cl.
CPC ... *H04N 5/243* (2013.01); *G06T 2207/20182* (2013.01); *G06T 2207/20216* (2013.01)

(58) Field of Classification Search
CPC . G06T 2207/10016; G06T 2207/20076; G06T 7/00; G06T 5/007; H04N 5/243; H04N 5/2351; H04N 5/217; G01N 21/59
See application file for complete search history.

(56) References Cited

U.S. PATENT DOCUMENTS

| | | | | |
|---|---|---|---|---|
| 9,288,458 | B1* | 3/2016 | Chen | H04N 9/646 |
| 9,305,242 | B2* | 4/2016 | Huang | G06T 5/00 |
| 9,305,339 | B2* | 4/2016 | Yang | G06K 9/4661 |
| 9,361,670 | B2* | 6/2016 | Huang | G06T 5/002 |
| 9,489,591 | B2* | 11/2016 | Hoya | G06K 9/4661 |
| 9,508,129 | B1* | 11/2016 | Wang | G06T 5/003 |
| 9,704,227 | B2* | 7/2017 | Li | G06K 9/40 |
| 9,710,715 | B2* | 7/2017 | Kikuchi | G06T 5/008 |
| 10,088,600 | B2* | 10/2018 | Ma | G01W 1/00 |
| 10,528,842 | B2* | 1/2020 | Lin | G06K 9/6298 |
| 2008/0273651 | A1* | 11/2008 | Boas | G06T 11/005 378/4 |
| 2014/0098263 | A1* | 4/2014 | Kobuna | H04N 5/2351 348/234 |
| 2014/0355875 | A1* | 12/2014 | Kachant | H04N 19/98 382/166 |
| 2015/0071563 | A1* | 3/2015 | Park | G06T 5/003 382/274 |
| 2015/0146980 | A1* | 5/2015 | Itoh | G06T 5/007 382/167 |
| 2015/0243003 | A1* | 8/2015 | Choi | G06T 5/50 382/274 |
| 2017/0064177 | A1* | 3/2017 | Sekine | H04N 5/2351 |
| 2018/0053288 | A1* | 2/2018 | Shah | G06T 5/009 |
| 2018/0122051 | A1* | 5/2018 | Li | G06T 5/009 |
| 2018/0122056 | A1* | 5/2018 | Kurihara | G06T 5/002 |
| 2018/0232862 | A1* | 8/2018 | Fujikawa | G06T 5/002 |
| 2018/0286066 | A1* | 10/2018 | Peng | G06T 5/002 |
| 2019/0068891 | A1* | 2/2019 | Hong | H04N 5/2351 |
| 2019/0089869 | A1* | 3/2019 | Fleizach | H04N 1/6027 |
| 2019/0147568 | A1* | 5/2019 | Paik | G06T 5/002 382/255 |
| 2019/0222722 | A1* | 7/2019 | Zhu | G06T 7/0002 |
| 2019/0318463 | A1* | 10/2019 | Zhang | G06T 5/10 |

FOREIGN PATENT DOCUMENTS

| | | |
|---|---|---|
| TW | I514323 B | 12/2015 |
| TW | 201610912 A | 3/2016 |

OTHER PUBLICATIONS

Kaiming He et al., "Single Image Haze Removal Using Dark Channel Prior," IEEE Transactions on Pattern Analysis and Machine Intelligence, vol. 33, No. 12, pp. 2341-2353, Dec. 2011.

Jin-Hwan Kim et al., "Optimized Contrast Enhancement for Real-time Image and Video Dehazing," Journal of Visual Communication and Image Representation, vol. 24, issue 3, pp. 410-425, Apr. 2013.

Bolun Cai et al., "Real-Time Video Dehazing Based on Spatio-Temporal MRF," Pacific-Rim Conference on Multimedia (PCM), 2016.

\* cited by examiner

VIDEO DEHAZING DEVICE AND METHOD

RELATED APPLICATIONS

This application claims priority to Taiwan Application Serial Number 107108903, filed Mar. 15, 2018, which is herein incorporated by reference.

BACKGROUND

Technical Field

The disclosure relates to a video processing method and a signal processing device, particularly to a video dehazing method and a video dehazing device.

Description of Related Art

With the technology development, various video processing technologies rely on the clarity of the inputted video. However, image affected by smoke, smog or other factor without dehazing timely as preprocessing will result in lower accuracy or failure in many imaging techniques, and may also lead to danger.

SUMMARY

One aspect of the present disclosure is a video dehazing method. The video dehazing method includes: capturing a hazy image including a plurality of inputted pixels by an image capture module; calculating an atmospheric light value according to the inputted pixels by an atmospheric light estimation unit; determining a sky image area according to the inputted pixels via the intermediate calculation results of a guided filter by a sky detection unit; calculating a dark channel image according to the inputted pixels based on dark channel prior (DCP) by a dark channel prior unit; calculating a fine transmission image according to the inputted pixels, the atmospheric light value, the sky image area and the dark channel image via a guided filter by a transmission estimation unit; generating a dehazing image according to the inputted pixels, the atmospheric light value and the fine transmission image by an image dehazing unit; and outputting the dehazing image by a video outputting module.

Another aspect of the present disclosure is video dehazing device. The video dehazing device includes an image capture module, an image output module and an image dehazing module. The image capture module is configured to capture a hazy image including multiple the inputted pixels. The image output module is configured to output a dehazing image. The image dehazing module is electrically coupled between the image capture module and the image output module, and configured to perform image dehazing to generate the dehazing image. The image dehazing module includes an atmospheric light estimation unit, a sky detection unit, a dark channel prior unit, a transmission estimation unit and an image dehazing unit. The atmospheric light estimation unit is electrically coupled to the image capture unit, and configured to calculate an atmospheric light value according to the inputted pixels. The sky detection unit is electrically coupled to the atmospheric light estimation unit, and configured to determine a sky image area according to the inputted pixels via the intermediate calculation results of a guided filter. The dark channel prior unit is electrically coupled to the image capture module, and configured to calculate a dark channel image according to the inputted pixels based on dark channel prior. The transmission estimation unit is electrically coupled to the dark channel prior unit and the sky detection unit, and configured to calculate a fine transmission image according to the inputted pixels, the atmospheric light value, the sky image area and the dark channel image via the guided filter. The image dehazing unit is electrically coupled to the transmission estimation unit and the image output module, and configured to generate the dehazing image according to the inputted pixels, the atmospheric light value and the fine transmission image.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the diagrams, some of the conventional structures and elements are shown with schematic illustrations.

To enable to perform dehazing processing for video, the present disclosure proposes a video dehazing method that may be applied to various image dehazing devices, such as instant and/or embedded image processing device. In some embodiments, the video dehazing method may be used for vehicle image processing. For example, the present disclosure may be implemented on an NVIDIA Jetson TX1 embedded platform, but it is merely possible embodiment and not intended to limit the present disclosure.

Figure 1:
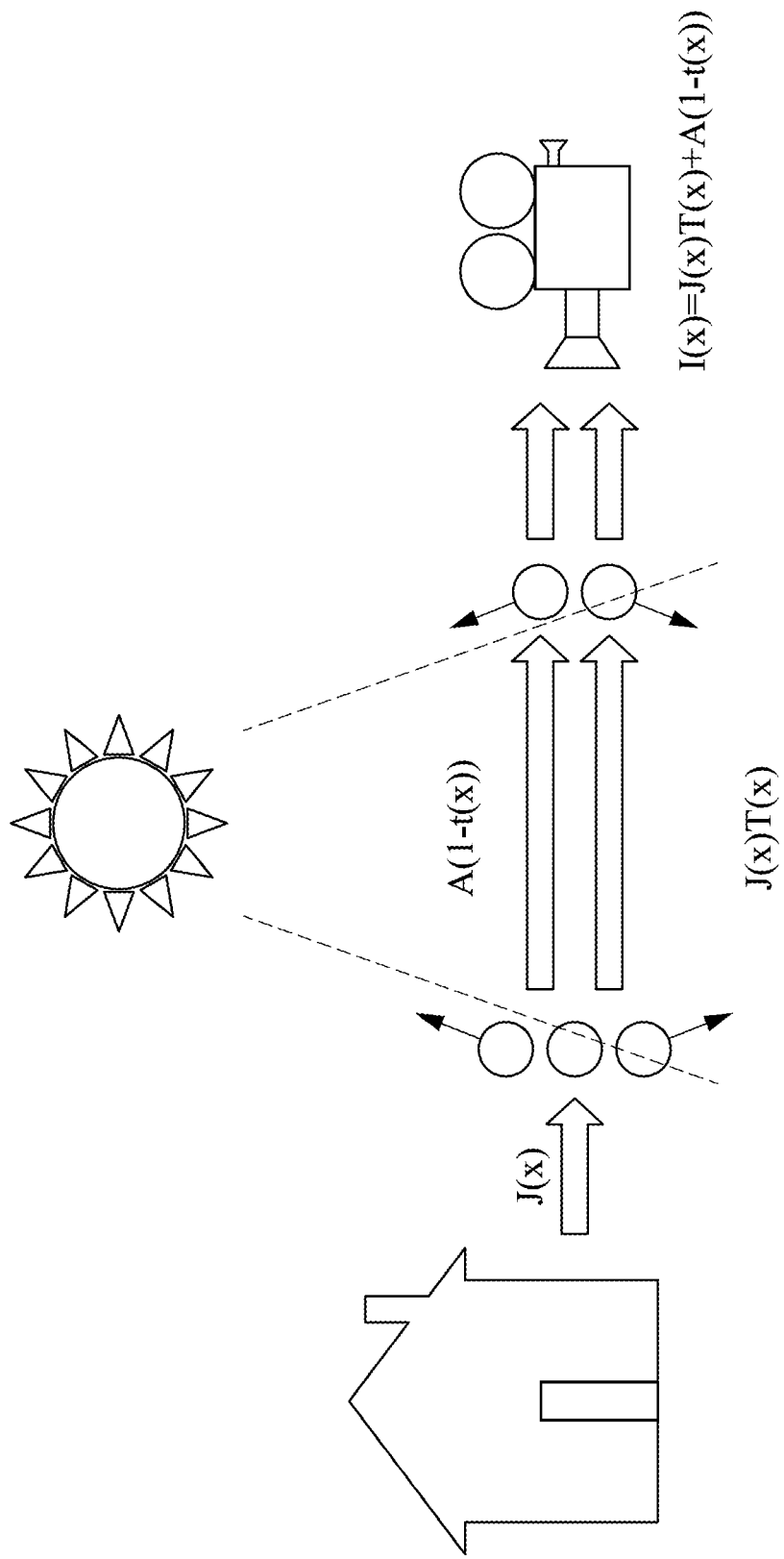
FIG. 1 is a schematic diagram illustrating an atmospheric scattering model in accordance with some embodiments of the disclosure.

The present disclosure is based on an atmospheric scattering model to preform dehazing processing. Please refer to FIG. 1. FIG. 1 is a schematic diagram illustrating the atmospheric scattering model in accordance with some embodiments of the disclosure. As shown in FIG. 1, the atmospheric scattering model is described by the following equation:

$$I(x)=J(x)T(x)+A(1-T(x))$$

J(x) is light radiated from scene objects, and when the light J(x) passes through the space, the suspended particles or other medium in the space will cause the light to be scattered, so that the image finally entering the photographing device is I(x). There are two parts will lead to light scattered. One is the natural energy attenuation, and T(x) represents the transmission of light without scattering in the propagation process. The other is influenced by ambient atmospheric light A. Accordingly, after two effects are superimposed, as shown in the above function, a hazy image I(x) affected by the fog is formed.

It may be seen that the relationship between the dehazing image J(x) and the hazy image I(x) will be affected by an atmospheric light value A and a transmission image T(x). In other words, to obtain the atmospheric light value A and the transmission image T(x) according to the received hazy image I(x) is able to revert and generate a dehazing image J(x).

Figure 2:
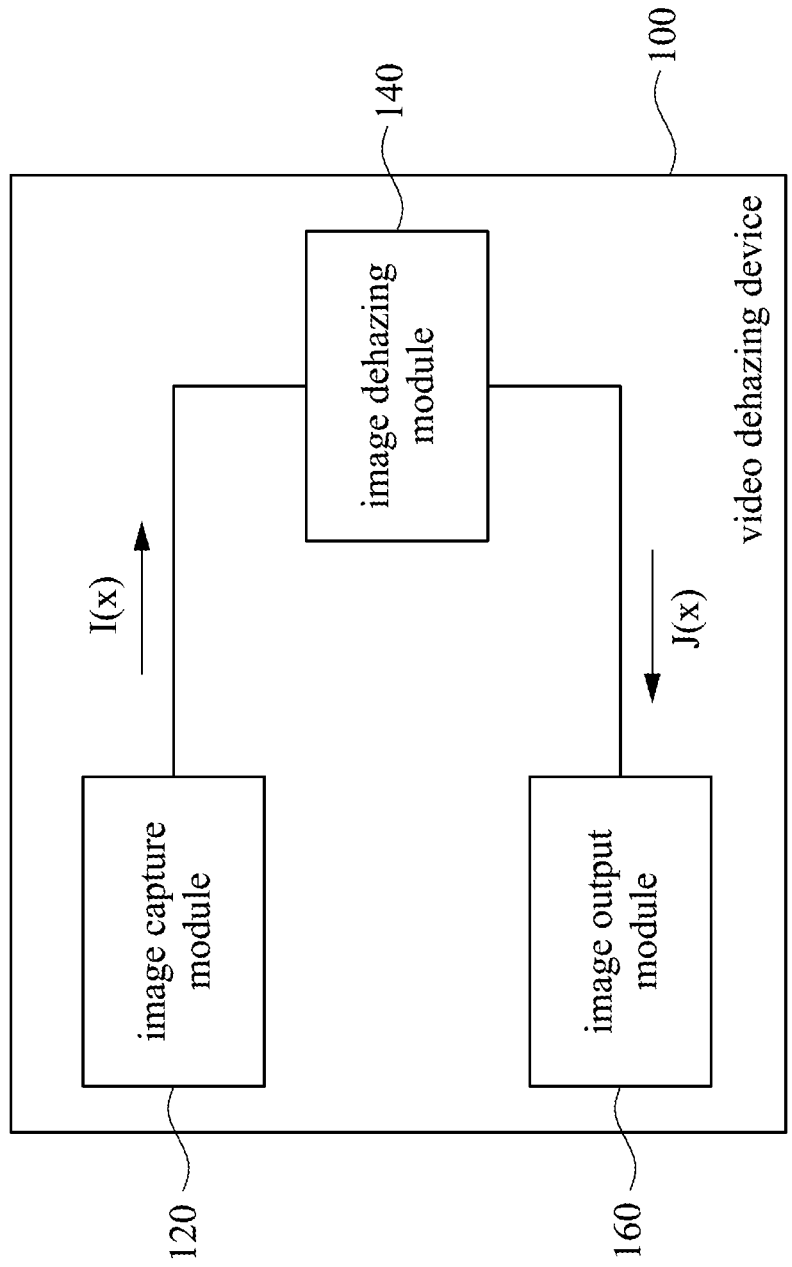
FIG. 2 is a schematic diagram illustrating a video dehazing device in accordance with some embodiments of the disclosure.

Please refer to FIG. 2. FIG. 2 is a schematic diagram illustrating a video dehazing device 100 in accordance with some embodiments of the disclosure. As shown in FIG. 2, in some embodiments, the video dehazing device 100 includes an image capture module 120, an image dehazing module 140 and an image output module 160.

In structure, the image capture module 120 is electrically coupled to the image dehazing module 140, and the image dehazing module 140 is electrically coupled to the image capture module 120 and the image output module 160. Operationally, the image capture module 120 is configured to capture the hazy image I(x), in which the hazy image I(x) includes multiple inputted pixels. The image dehazing module 140 is configured to perform image dehazing processing to generate the dehazing image J(x) from the hazy image I(x). The image output module 160 is configured to output the dehazing image J(x).

In some embodiments, the image capture module 120 may be realized by any image capturing device that may be connected to embedded devices, such as a webcam, a digital camera, a smart phone, and a driving recorder, etc. In addition, in some embodiments, the image output module 160 may be any display device compatible with embedded system platforms, and the output interface of the image output module 160 may be implemented by VGA, DVI, HDMI, Display Port, etc. The above is merely an example, and not intended to limit the present disclosure.

Figure 3:
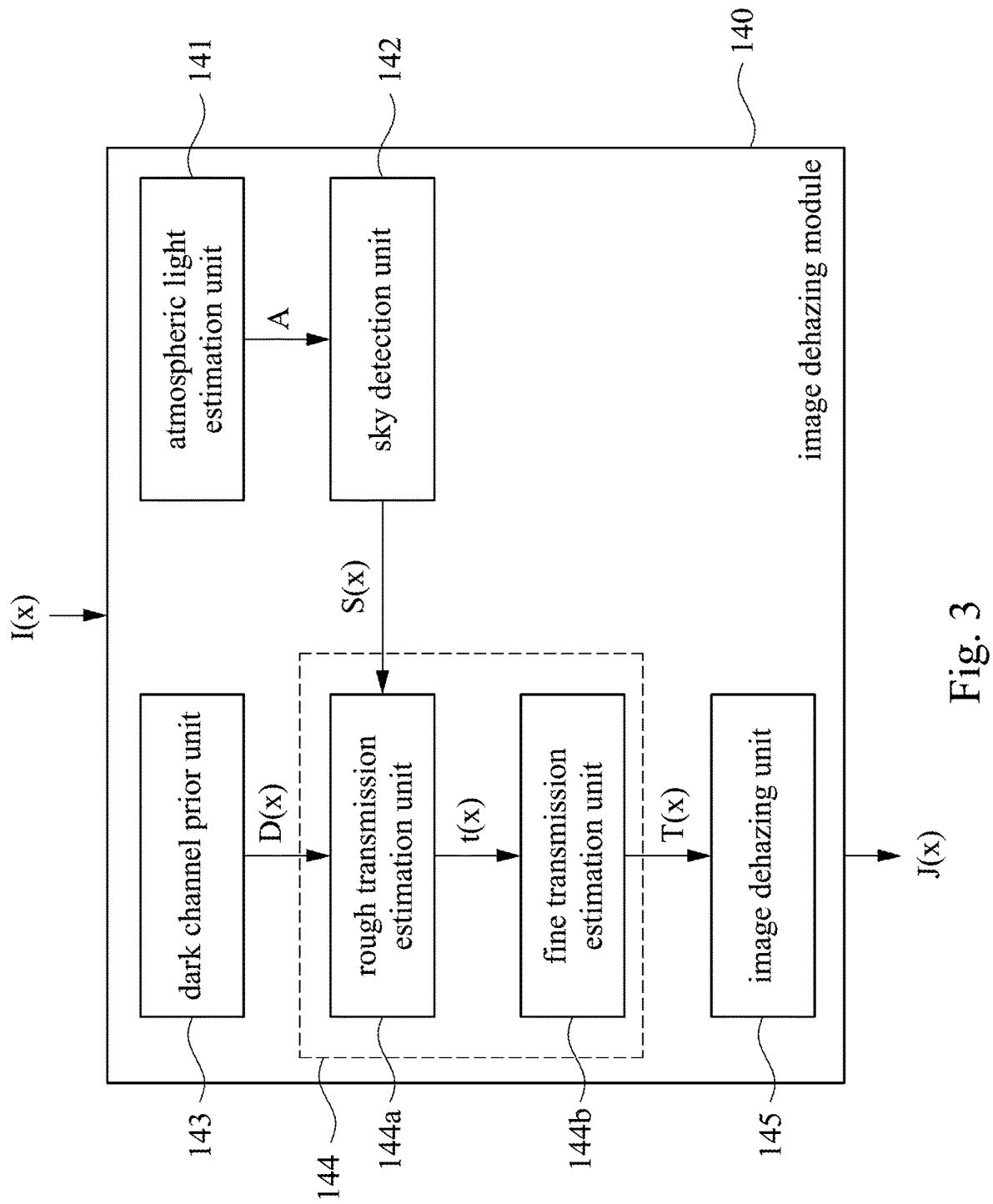
FIG. 3 is a detailed schematic diagram illustrating of an image dehazing module in accordance with some embodiments of the disclosure.

Please refer to FIG. 3. FIG. 3 is a detailed schematic diagram illustrating of an image dehazing module 140 in accordance with some other embodiments of the disclosure. As shown in FIG. 3, in some embodiments, the image dehazing module 140 includes an atmospheric light estimation unit 141, a sky detection unit 142, a dark channel prior unit 143, a transmission estimation unit 144 and an image dehazing unit 145. In practice, the image dehazing module 140 may be implemented by various processing circuits, a digital signal processor (DSP), a complex programmable logic device (CPLD), a field-programmable gate array (FPGA) etc.

In structure, the atmospheric light estimation unit 141 is electrically coupled to the sky detection unit 142. The sky detection unit 142 is electrically coupled to the atmospheric light estimation unit 141 and the transmission estimation unit 144. The dark channel prior unit 143 is electrically coupled to the transmission estimation unit 144. The transmission estimation unit 144 is electrically coupled to the sky estimation unit 142, the dark channel prior unit 143 and the image dehazing unit 145. The image dehazing unit 145 is electrically coupled to the transmission estimation unit 144.

Operationally, the atmospheric light estimation unit 141 is configured to receive the hazy image I(x) from the image capture module 120, and calculate the atmospheric light value A according to the inputted pixels included by the hazy image I(x). The sky detection unit 142 is configured to determine a sky image area S(x) according to the inputted pixels via the intermediate calculation results of a guided filter. The dark channel prior unit 143 is configured to receive the hazy image I(x) from the image capture module 120, and calculate a dark channel image D(x) according to the inputted pixels included by the hazy image I(x) based on dark channel prior. The transmission estimation unit 144 is configured to calculate a fine transmission image T(x) according to the inputted pixels included by the hazy image I(x), the atmospheric light value A, the sky image area S(x) and dark channel image D(x) via the guided filter. The image dehazing unit 145 is configured to generate the dehazing image J(x) according to the inputted pixels included by the hazy image I(x), the atmospheric light value A and the fine transmission image T(x).

In some embodiments, the transmission estimation unit 144 includes a rough transmission estimation unit 144a and a fine transmission estimation unit 144b. The rough transmission estimation unit 144a is electrically coupled to the dark channel prior unit 143 and the fine transmission estimation unit 144b, and configured to calculate a rough transmission image t(x) according to the inputted pixels, the atmospheric light value A, the sky image area S(x) and dark channel image D(x). The fine transmission estimation unit 144b is electrically coupled to the rough transmission estimation unit 144a and the image dehazing unit 145, and configured to generate the fine transmission image T(x) according to the rough transmission image t(x) via the guided filter.

Figure 4:
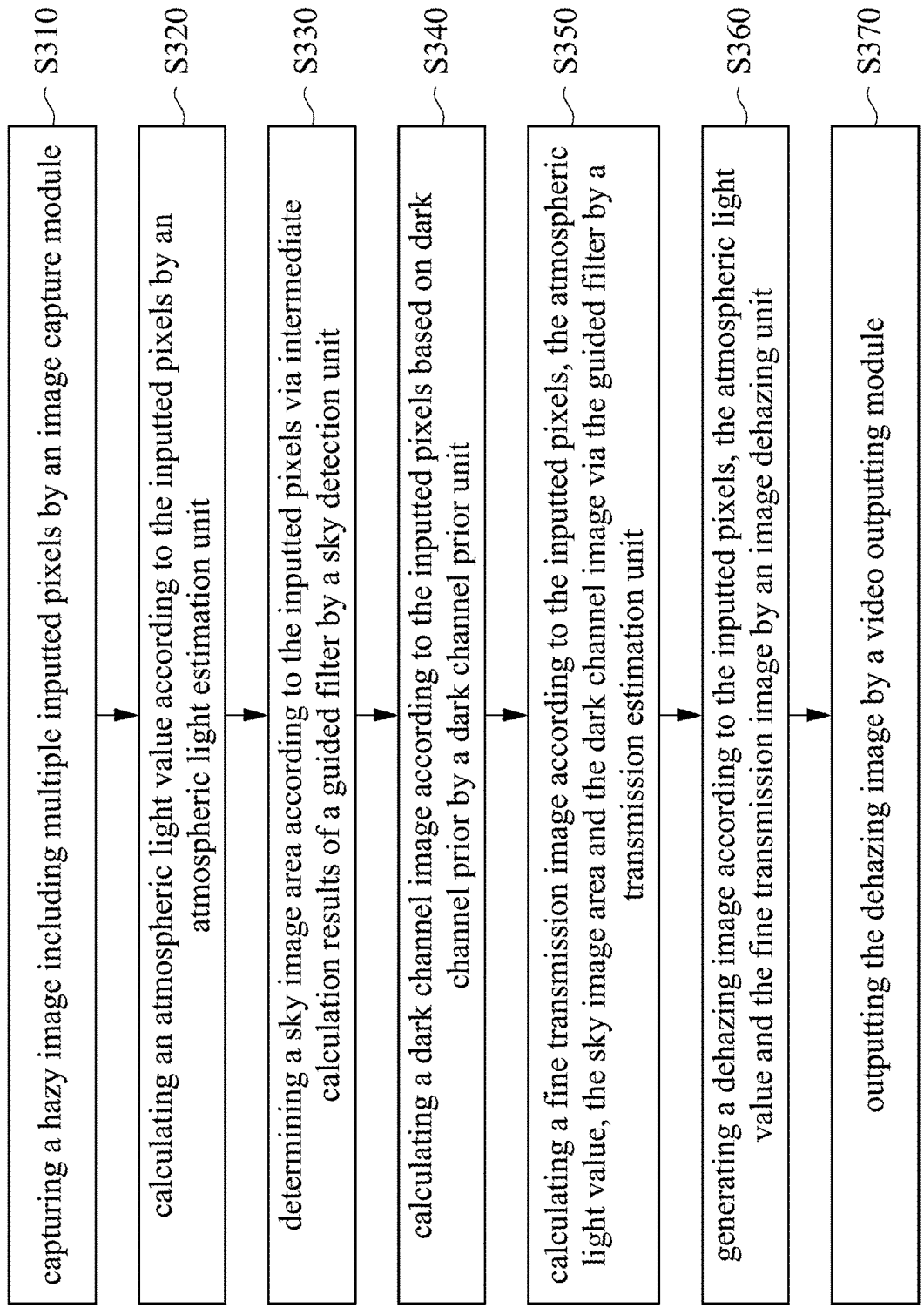
FIG. 4 is a flowchart illustrating of a video dehazing method in accordance with some embodiments of the disclosure.

For the convenience and clarity of explanation, the specific operation of each component of the image dehazing module 140 will be explained with accompanying of figures in the following paragraphs. Please refer to FIG. 4. FIG. 4 is a flowchart illustrating of a video dehazing method 300 in accordance with some embodiments of the disclosure. For the convenience and clarity of explanation, the following video dehazing method 300 is described in accompanying with the embodiments shown in FIG. 2 and FIG. 3, but not limited thereto. Various alterations and modifications may be performed on the disclosure by those of ordinary skilled in the art without departing from the principle and spirit of the disclosure. As shown in FIG. 4, the video dehazing method 300 includes steps S310, S320, S330, S340, S350, S360 and S370.

Firstly, in step S310, capturing the hazy image I(x) including multiple inputted pixels by the image capture module 120. Specifically, the image capture module 120 captures the hazy video into a series of the hazy images I(x), in which each hazy image I(x) includes multiple inputted pixels. For example, in some embodiments, the hazy image I(x) may include 720×480 inputted pixels. The number is merely for possible embodiments and is not intended to limit the present disclosure.

Next, step S320 is executed. In step S320, calculating an atmospheric light value A according to the inputted pixels included by the hazy image I(x) by the atmospheric light estimation unit 141. For the convenience of explanation, the specific content about calculating the atmospheric light value A will be explained in the following paragraphs.

Figure 5B:
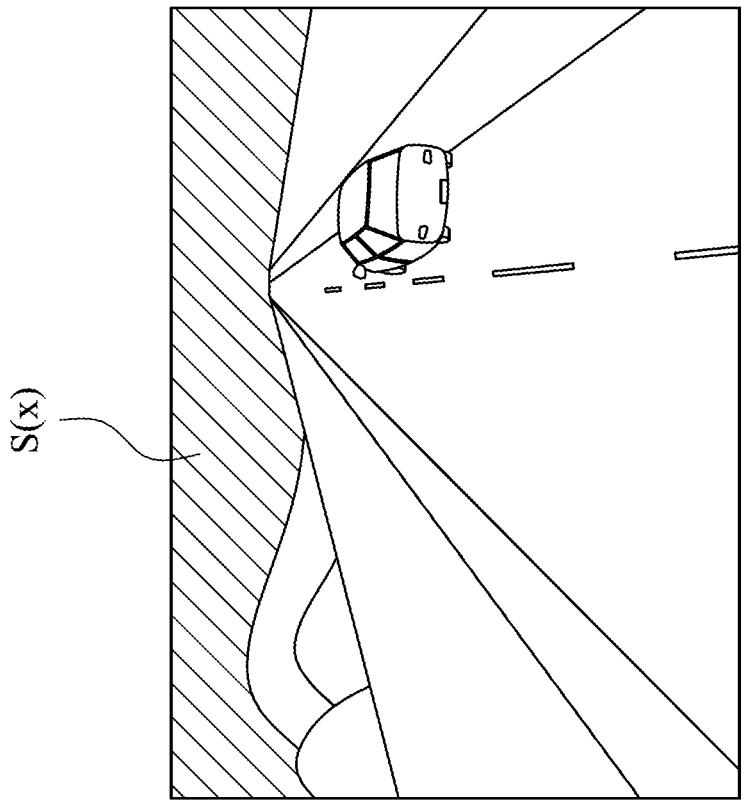
FIGS. 5A and 5B are schematic diagrams illustrating of a sky image area in accordance with some embodiments of the disclosure.
Figure 5A:
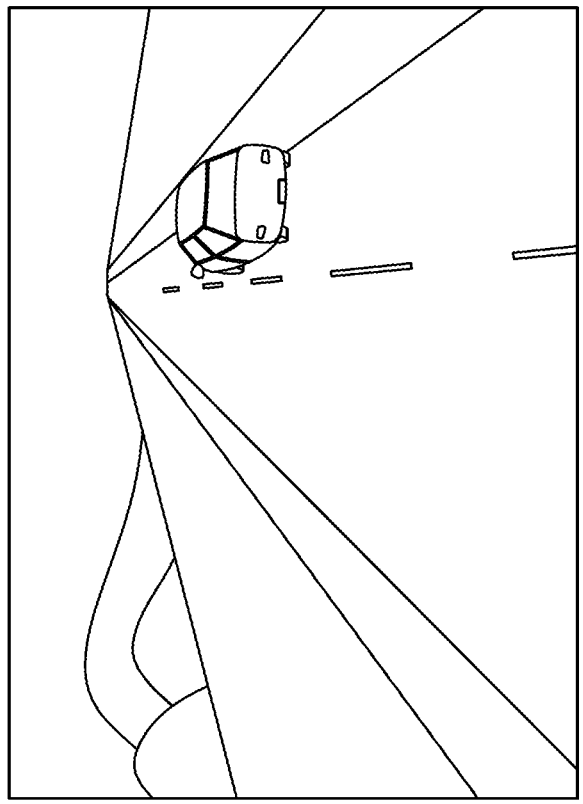

Next, step S330 is executed. In step S330, determining the sky image area S(x) according to the inputted pixels via the intermediate calculation results of the guided filter by the sky detection unit 142. For the convenience of explanation, please refer to FIG. 5A and FIG. 5B together. FIGS. 5A and 5B are schematic diagrams illustrating of a sky image area S(x) in accordance with some embodiments of the disclosure. As shown in FIG. 5A, the obtained hazy image includes the sky image area S(x) and a non-sky image area. As shown in FIG. 5B, the sky detection unit 142 is able to determine the slashed area as the sky image area S(x). For the convenience of explanation, the specific content about determining the sky image area S(x) will be explained in the following paragraphs.

Next, step S340 is executed. In step S340, calculating the dark channel image D(x) according to the inputted pixels based on dark channel prior (DCP) by the dark channel prior unit 143. Specifically, in some embodiments, the image dark channel D(x) is calculated as follows:

$$D(x) = \min_{c \in \{r,g,b\}} \left( \min_{y \in \Omega(x)} I^c(y) \right)$$

y is all inputted pixels in the fixed region Ω(x), and $I^c(y)$ represents the three color channels of all inputted pixels y in the fixed region Ω(x).

Accordingly, the calculation of the dark channel prior, that is, a minimum value filter regards as the dark channel value of the inputted pixel the minimum intensity value among all the inputted pixels within the minimum radius range (i.e., the fixed region Ω(x)) around each inputted pixel in the hazy image I(x), and the dark channel image D(x) is obtained by this, in which the minimum radius may be any positive integer. In some embodiments, the minimum radius may be 5, 6, 7, 8, 9 or 10 pixels.

Furthermore, in some embodiments, the dark channel prior unit 143 is further configured to calculate in both horizontal and vertical directions via a one-dimensional fast filter and concept of queue. Specifically, the dark channel prior unit 143 replaces a matrix operation usually performed by a two-dimensional filter with a one-dimensional operation performed from both the horizontal and vertical directions, so that the computational complexity decreases from $O(n^2)$ to $O(n)$, and to reduce the repetitive extraction of inputted pixels values by concept of queue.

Next, step S350 is executed. In step S350, calculating the fine transmission image T(x) according to the inputted pixels, the atmospheric light value A, the sky image area S(x) and the dark channel image D(x) via the guided filter by the transmission estimation unit 144. Specifically, the rough transmission estimation unit 144a sets a transmission rate based on the corresponding atmospheric light value A for each inputted pixel so as to obtain the rough transmission image t(x). For example, the calculation may be as following equation:

$$t(x) = 1 - \omega \min_{c \in \{r,g,b\}} \left( \min_{y \in \Omega(x)} \frac{I^c(y)}{A} \right)$$

ω is a correction coefficient between 0 and 1, and configured to retain part of the fog and make the image more natural. In some embodiments, ω may be any value between 0.8~0.95, e.g., 0.8, 0.85, 0.9 or 0.95. In addition, in some other embodiments, ω may also be adjusted based on actual need, and not intended to limit the present disclosure. Next, the rough transmission estimation unit 144a sets a lower limit value of the transmission rate by a sky transmission rate according to whether the inputted pixel belongs to the sky image area S(x), so as to avoid noise resulted from over reduction. Then the fine transmission estimation unit 144b processes the rough transmission image t(x) via the guided filter to obtain the fine transmission image T(x). The sky transmission rate is any real number between 0 and 1. In some embodiments, the sky transmission rate may be 0.2, 0.3 or 0.4.

Furthermore, in some embodiments, the fine transmission estimation unit 144b processes the image by a fast guided filter to exchange processing efficiency with loss of precision. In other words, the fine transmission estimation unit 144b reduces the hazy image I(x) based on a scale P and use the guided filter to process, and then zooms back to the original image size, in which P may be any real number between 0 and 1. In some other embodiments, the fine transmission estimation unit 144b is further configured to calculate the fine transmission image according to the inputted pixels, the atmospheric light value, the sky image area and the dark channel image by a lookup table via the guided filter so as to accelerate computational efficiency. And in some other embodiments, the transmission estimation unit 144 as same as the dark channel prior unit 143 is further configured to perform the operation on the hazy image I(x) in both horizontal and vertical directions via a one-dimensional fast filter and concept of queue. The relevant description has been described in the above paragraph, thus further explanation is omitted.

Next, step S360 is executed. In step S360, generating the dehazing image J(x) according to the inputted pixels, the atmospheric light value A and the fine transmission image T(x) by the image dehazing unit 145. Specifically, the image dehazing unit 145 performs the operation on each color channel according to the following equation to revert the dehazing image J(x):

$$J(x) = \frac{I(x) - A}{\max(T(x), t_0)} + A$$

$t_0$ is the lower limit value of the transmission rate in the fine transmission image to avoid noise resulted from over reduction. $t_0$ may be any real number between 0 and 1, in some embodiments, $t_0$ may be 0.1, 0.2 or 0.3.

In some embodiments, in the present disclosure, in step S360, the parallelization technology pthread is utilized to take advantage of a multi-core processor to perform the dehazing calculation of the three color planes of RGB at the same time so as to speed up the calculation efficiency.

Finally, step S370 is executed. In step S370, outputting the dehazing image by a video outputting module. Specifically, the video outputting module 160 continuously outputs the dehazing images J(x) generated by the image dehazing unit 145 as a dehazing video. In this way, a real-time dehazing video is able to be generated via real-time fast single-image dehazing processing.

Figure 6:
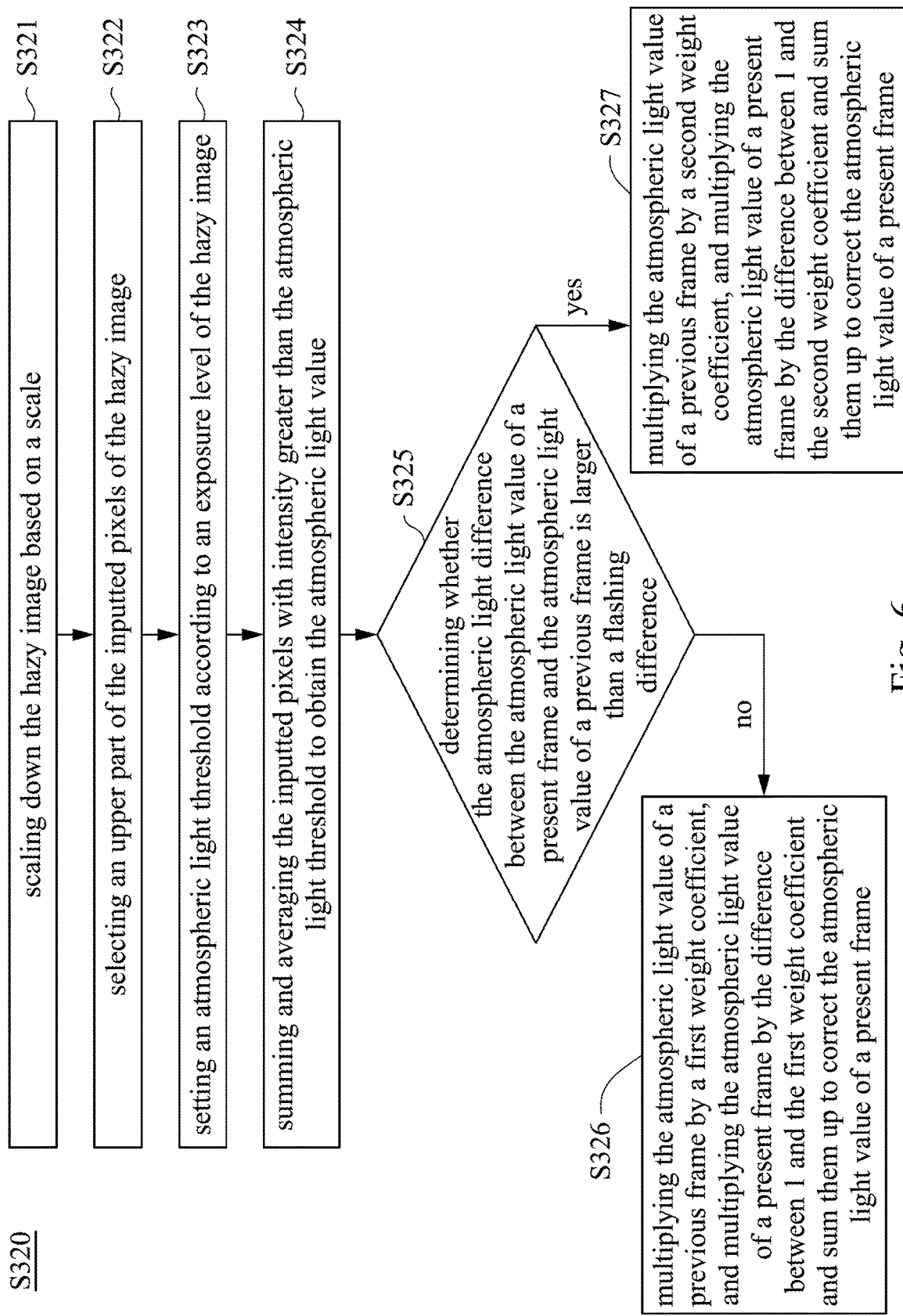
FIG. 6 is a flowchart illustrating of a video dehazing method in accordance with some other embodiments of the disclosure.

Please refer to FIG. 6. FIG. 6 is a detailed flowchart illustrating of step S320 about calculating the atmospheric light value in the video dehazing method 300 in accordance with some embodiments of the disclosure. As shown in FIG. 6, in some embodiments, step S320 further includes steps S321~S327. In step S321, scaling down the received hazy image I(x) based on a scale by the atmospheric light estimation unit 141 so as to exchange processing efficiency with loss of precision, in which the scale may be any real number between 0 and 1. For instance, the scale may be 0.4, 0.5, 0.6, 0.7 or 0.8.

Next, step S322 is executed. In step S322, selecting an upper part of the inputted pixels of the hazy image I(x) then performing calculation by the atmospheric light estimation unit 141. For example, the hazy image I(x) is an image with resolution D1 (720×480), and the atmospheric light estimation unit 141 selects the upper 720×240 inputted pixels in the hazy image I(x) to perform the next step. Since the sky region that easily affects atmospheric light value estimation is usually located in the upper part of the image, by selecting the upper part of the inputted pixels for calculation, the amount of calculation is able to be reduced without affecting the calculation result. It should be noticed that the values above are merely possible embodiments and not intended to limit the present disclosure.

Next, step S323 is executed. In step S323, setting an atmospheric light threshold according to an exposure level of the hazy image I(x) by the atmospheric light estimation unit 141. Specifically, when the exposure level of the hazy image I(x) is higher, the atmospheric light threshold is set higher. When the exposure level of the hazy image I(x) is lower, the atmospheric light threshold is set lower so as to avoid the dehazing image J(x) reverted too dark.

Next, step S324 is executed. In step S324, summing and averaging the inputted pixels with intensity greater than the atmospheric light threshold to obtain the atmospheric light value A by the atmospheric light estimation unit 141, in which the atmospheric light threshold may be any real number 0 and 255. In some embodiments, the atmospheric light threshold may be a real number between 175 and 205. For instance, when the atmospheric light threshold is set 200, the atmospheric light estimation unit 141 sums up the inputted pixels with intensity is between 200 and 255 in the hazy image I(x) and averages them to obtain the atmospheric light value A.

Next, step S325 is executed. In step S325, determining whether the atmospheric light difference between the atmospheric light value $A_t$ of a present frame and the atmospheric light value $A_{t-1}$ of a previous frame is larger than a flashing difference, in which the flashing difference may be any real number. In some embodiments, the flashing difference may be 3, 4, 5, 6, 7, 8, 9 or 10. If the atmospheric light difference is not larger than the flashing difference, step S326 is executed. If the atmospheric light difference is larger than the flashing difference, step S327 is executed.

In step S326, multiplying the atmospheric light value $A_{t-1}$ of a previous frame by a first weight coefficient $\lambda_1$, and multiplying the atmospheric light value $\lambda_t$ of a present frame by the difference between 1 and the first weight coefficient $1-\lambda_1$ and sum them up to correct the atmospheric light value $\lambda_t$ of a present frame by the atmospheric light estimation unit 141. Specifically, as shown in the following equation:

$$A_t = \lambda_1 A_{t-1} + (1-\lambda_1) A_t$$

The first weight coefficient $\lambda_1$ may be any real number between 0 and 1. In some embodiments, the first weight coefficient $\lambda_1$ may be 0.8, 0.85, 0.9 or 0.95.

In step S327, similar to step S326, multiplying the atmospheric light value $\lambda_{t-1}$ of a previous frame by a second weight coefficient $\lambda_2$, and multiplying the atmospheric light value $\lambda_t$ of a present frame by the difference between 1 and the second weight coefficient $1-\lambda_2$ and sum them up to correct the atmospheric light value $\lambda_t$ of a present frame by the atmospheric light estimation unit 141, in which the second weight coefficient $\lambda_2$ is larger than the first weight coefficient $\lambda_1$. In some embodiments, the second weight coefficient $\lambda_2$ may be 1. In other words, the atmospheric light estimation unit 141 replaces the atmospheric light value $\lambda_t$ of the present frame with the atmospheric light value $\lambda_{t-1}$ of the previous frame.

In this way, the method for calculating the atmospheric light value A according to the present disclosure that merely needs to extract the inputted pixels once and then average them reduces the calculation amount of atmospheric light value A and improves the phenomenon that the dark channel prior makes the dehazing image J(x) dark, and also adjusts the atmospheric light value A by the atmospheric light difference to stabilize the consistency of the brightness of dehazing image J(x) so as to reduce the flashing of video.

Figure 7:
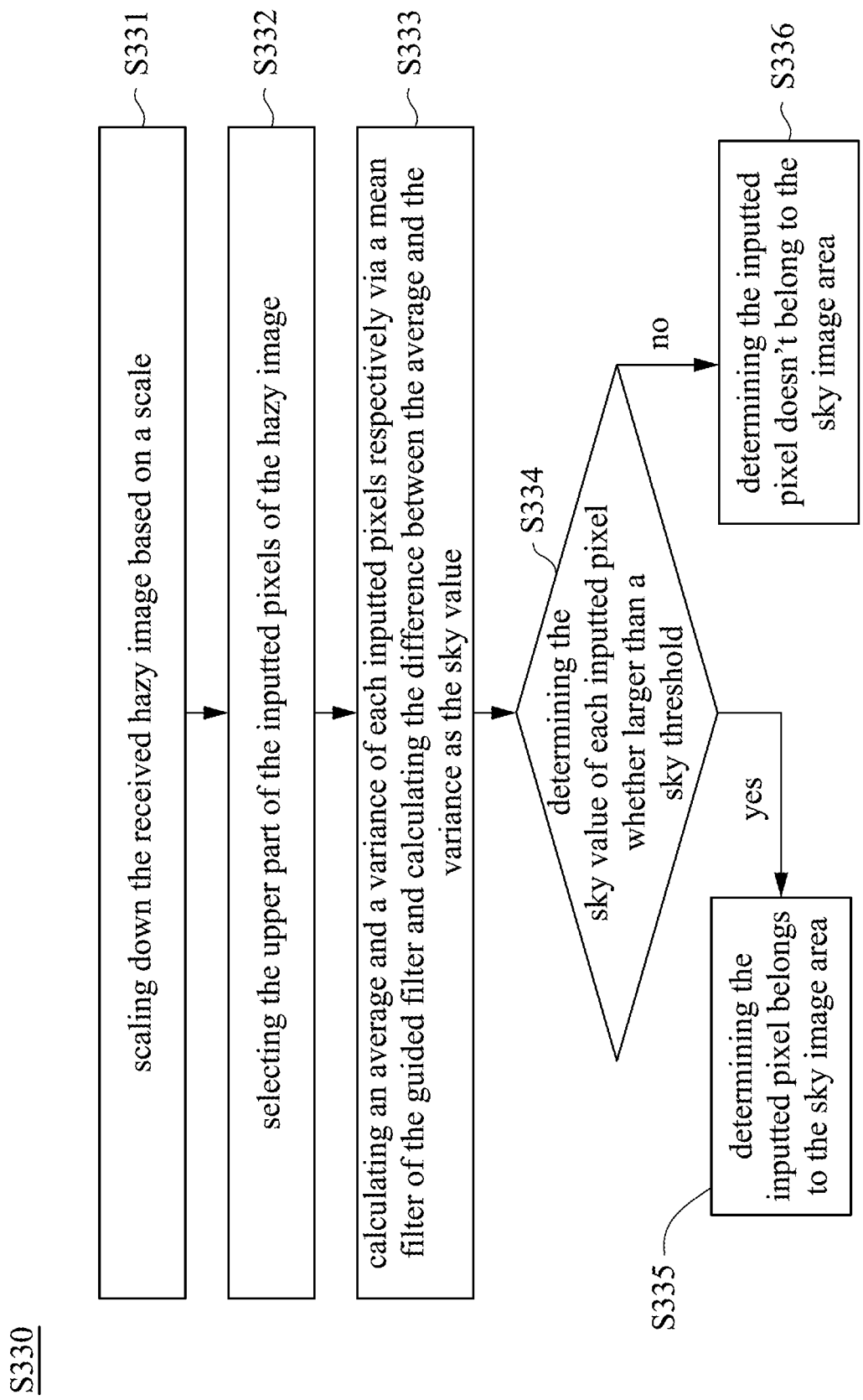
FIG. 7 is a flowchart illustrating of a video dehazing method in accordance with some other embodiments of the disclosure.

Please refer to FIG. 7. FIG. 7 is another detailed flowchart of step S330 about determining the sky image area S(x) in the video dehazing method 300 illustrated in accordance with some embodiments of the disclosure. As shown in FIG. 7, in some embodiments, step S330 includes steps S331-S336 to determine whether the inputted pixels belongs to the sky image area S(x).

Similar to step S321, in step 331, scaling down the received hazy image I(x) based on a scale by the sky detection unit 142. For instance, the received hazy image I(x) may be scaled down based on any real number between 0 and 1, Similar to step S322, in step S332, selecting the upper part of the inputted pixels of the hazy image I(x) by the sky detection unit 142. The relevant description has been described in the above paragraph thus further explanation is omitted.

Next, step S333 is executed. In step S333, calculating an average $I_{mean}$ and a variance $I_{var}$ of each inputted pixels respectively via a mean filter of the guided filter by the sky detection unit 142, and calculating the difference between the average $I_{mean}$ and the variance $I_{var}$ as the sky value $I_{sky}$. Specially, the related calculation may be shown as following:

$$I_{mean} = F_{mean}(I)$$

$$I_{corr} = F_{mean}(I \cdot {}^*I)$$

$$I_{var} = I_{corr} - I_{mean} \cdot {}^*I_{mean}$$

$$I_{sky}(x) = I_{mean}(X) - I_{var}(x)$$

Next, step S334 is executed. In step S334, determining the sky value $I_{sky}$ of each inputted pixel whether larger than a sky threshold by the sky detection unit 142, in which the sky threshold may be any real number between 0 and 1. In some embodiments, the sky threshold may be 0.4, 0.5, 0.6 or 0.7, but not intended to limit the present disclosure.

On the condition that the sky detection unit 142 determines that the sky value $I_{sky}$ of the inputted pixels is larger than the sky threshold, step S335 is executed. In step S335, determining the inputted pixel belongs to the sky image area S(x) by the sky detection unit 142.

On the other hand, on the condition that the sky detection unit 142 determines that the sky value $I_{sky}$ of the inputted pixels is not larger than the sky threshold, step S336 is executed. In step S336, determining the inputted pixel doesn't belong to the sky image area S(x) by the sky detection unit 142.

In this way, the method for detecting the sky image area S(x) according to the present disclosure improves the phenomenon that the noise is easily generated in the sky part due to dark channel prior, and the detected sky image area S(x) is preserved, so that the dehazing image J(x) becomes more natural without over reduction.

It should be noticed that the computing resources of the guided filter may be used together in steps S330 and S350, so that there are no additional computing resources needed to detect the sky.

Furthermore, in some embodiments, adjusting an average radius of the mean filter of main units in the guided filter according to the flashing level of the hazy image J(x). When the flashing level of the dehazing image J(x) is larger, the mean radius of the mean filter is increased so as to reduce the regional effect produced by the filter and make the image more uniform in spatial distribution. The mean radius may be any real number between about 25 and about 70. In some embodiments, the mean radius is about 28. In this way, the consistency of the images in timing is maintained and the phenomenon of flashing video is reduced.

On the other hand, in some embodiments, the present disclosure utilizes the parallelization technique SIMD to increase the rate of processing image. Specifically, processing multiple instructions in the filter by SIMD technique speeds up the program to achieve real-time processing of video dehazing. In the present disclosure, the video dehazing device 100 is able to achieve a processing speed of 75 fps at a resolution of D1 (720×480).

The video dehazing method 300 depicted above is described in accompanying with the embodiments shown in FIG. 1 FIG. 7, but not meant to limit thereto. Various alterations and modifications may be performed on the disclosure by those of ordinary skilled in the art without departing from the principle and spirit of the disclosure. Thus, the protective scope of the disclosure shall be defined by the appended claims.

In the foregoing, exemplary steps are included. However, these steps do not need to be performed sequentially. The steps mentioned in the embodiment may be adjusted according to actual needs unless the order is specifically stated, and may even be performed simultaneously or partially simultaneously.

Furthermore, each of the above embodiments may be implemented by various types of digital or analog circuits or by different integrated circuit chips. Individual components may also be integrated into a single control chip. Various control circuits may also be implemented by various processors or other integrated circuit chips. The above is only an example, and it should not limit the present disclosure.

In summary, in various embodiments of the present disclosure, according to the dark channel prior as the base algorithm, simplifying the calculation of the atmospheric light value and adjusting the atmospheric light value for processing video, and detecting the sky image area via the intermediate calculation result of the guided filter improves the stability and accuracy of the video dehazing processing on the embedded platform.

Although specific embodiments of the disclosure have been disclosed with reference to the above embodiments, these embodiments are not intended to limit the disclosure. Various alterations and modifications may be performed on the disclosure by those of ordinary skills in the art without departing from the principle and spirit of the disclosure. Thus, the protective scope of the disclosure shall be defined by the appended claims.

What is claimed is:

1. A video dehazing method, comprising:
   capturing, by an image capture circuit, a hazy image comprising a plurality of inputted pixels;
   calculating an atmospheric light value according to the plurality of inputted pixels by an atmospheric light estimation circuit;
   determining a sky image area according to the plurality of inputted pixels via intermediate calculation results of a guided filter by a sky detection circuit;
   calculating a dark channel image according to the plurality of inputted pixels based on dark channel prior by a dark channel prior circuit;
   calculating a fine transmission image according to the plurality of inputted pixels, the atmospheric light value, the sky image area and the dark channel image via the guided filter by a transmission estimation circuit;
   generating a dehazing image according to the plurality of inputted pixels, the atmospheric light value and the fine transmission image by an image dehazing circuit; and
   outputting the dehazing image by a video outputting circuit;
   wherein the operation of calculating the atmospheric light value comprises:
      setting an atmospheric light threshold according to an exposure level of the hazy image by the atmospheric light estimation circuit; and
      summing and averaging the plurality of inputted pixels with an intensity greater than the atmospheric light threshold to obtain the atmospheric light value by the atmospheric light estimation circuit.

2. The video dehazing method of claim 1, wherein the operation of calculating the atmospheric light value comprises:
   calculating an atmospheric light difference between the atmospheric light value of a present frame of the hazy image and the atmospheric light value of a previous frame of the hazy image, and adjusting the atmospheric light value of the present frame according to the atmospheric light difference.

3. The video dehazing method of claim 1, wherein the operation of determining the sky image area comprises:
   calculating averages and variances of the plurality of inputted pixels respectively according to the plurality of inputted pixels and determining whether the plurality of inputted pixels belong to the sky image area respectively according to the averages and the variances by the sky detection circuit.

4. The video dehazing method of claim 1, wherein the operation of calculating the dark channel image comprises:
   regarding an inputted pixel with minimum intensity value within a minimum radius around one of the plurality of inputted pixel as the dark channel of the one of the plurality of inputted pixels via a minimum filter by the dark channel prior circuit.

5. The video dehazing method of the claim 1, wherein the operation of calculating the fine transmission image comprises:
   calculating a rough transmission image according to the plurality of inputted pixels, the atmospheric light value, the sky image area and the dark channel image by a rough transmission estimation circuit; and
   generating the fine transmission image according to the rough transmission image via the guided filter by a fine transmission estimation circuit.

6. The video dehazing method of claim 5, wherein the operation of calculating the fine transmission image comprises:
   calculating the fine transmission image according to the plurality of inputted pixels, the atmospheric light value, the sky image area and the dark channel image via a lookup table by the fine transmission estimation circuit.

7. The video dehazing method of claim 5, wherein the operation of calculating the fine transmission image comprises:
adjusting the rough transmission image according to a correction coefficient by the rough transmission estimation circuit.

8. The video dehazing method of claim 1, wherein the operation of calculating fine transmission image comprises:
adjusting a transmission rate of the plurality of inputted pixels in the sky image area according to the sky image area and a sky transmission rate by the transmission estimation circuit.

9. The video dehazing method of claim 1, further comprising:
scaling down the hazy image by a scale and calculating the atmospheric light value by the atmospheric light estimation circuit; and
determining the sky image area via the intermediate calculation results of the guided filter after the hazy image scaled down by the scale by the sky detection circuit.

10. The video dehazing method of claim 1, further comprising:
selecting an upper part of the plurality of inputted pixels to calculate the atmospheric light value by the atmospheric light estimation circuit; and
determining the sky image area via the intermediate calculation results of the guided filter according to the upper part of the plurality of inputted pixels by the sky detection circuit.

11. The video dehazing method of claim 1, further comprising:
calculating in both horizontal direction and vertical direction via a one-dimensional fast filter.

12. The video dehazing method of claim 1, wherein the operation of the guided filter comprising:
adjusting an average radius of a mean filter in the guided filter according to a flashing level of the hazy image.

13. A video dehazing device, comprising:
an image capture circuit configured to capture a hazy image comprising a plurality of inputted pixels;
an image output circuit configured to output a dehazing image; and
an image dehazing circuit electrically coupled between the image capture circuit and the image output circuit, and configured to perform image dehazing to generate the dehazing image, wherein the image dehazing circuit comprises:
an atmospheric light estimation circuit electrically coupled to the image capture circuit, and configured to calculate an atmospheric light value according to the plurality of inputted pixels;
a sky detection circuit electrically coupled to the atmospheric light estimation circuit, and configured to determine a sky image area according to the plurality of inputted pixels via intermediate calculation results of a guided filter;
a dark channel prior circuit electrically coupled to the image capture circuit, and configured to calculate a dark channel image according to the plurality of inputted pixels based on dark channel prior;
a transmission estimation circuit electrically coupled to the dark channel prior circuit and the sky detection circuit, and configured to calculate a fine transmission image according to the plurality of inputted pixels, the atmospheric light value, the sky image area and the dark channel image via the guided filter; and
an image dehazing circuit electrically coupled to the transmission estimation circuit and the image output circuit, and configured to generate the dehazing image according to the plurality of inputted pixels, the atmospheric light value and the fine transmission image;
wherein the atmospheric light estimation circuit is further configured to set an atmospheric light threshold according to a exposure level of the hazy image, and to sum and average the plurality of inputted pixels with intensity greater than the atmospheric light threshold to obtain the atmospheric light value.

14. The video dehazing device of claim 13, wherein the image dehazing circuit is further configured to scale down the hazy image by a scale.

15. The video dehazing device of claim 13, wherein the image dehazing circuit is further configured to select an upper part of the plurality of inputted pixels.

16. The video dehazing device of claim 13, wherein the atmospheric light estimation circuit is further configured to calculate an atmospheric light difference between the atmospheric light value of a present frame of the hazy image and the atmospheric light value of a previous frame of the hazy image and adjust the atmospheric light value of the present frame according to the atmospheric light difference.

17. The video dehazing device of claim 13, wherein the sky detection circuit is further configured to calculate averages and variances of the plurality of inputted pixels respectively according to the plurality of inputted pixels and determine whether the plurality of inputted pixels belong to the sky image area according to the corresponding average and the variance.

18. The video dehazing device of claim 13, wherein the transmission estimation circuit is further configured to adjust a transmission rate of the plurality of inputted pixels in the sky image area according to the sky image area and a sky transmission rate.

* * * * *